Nov. 9, 1965    J. F. DRENTER    3,216,739
ADJUSTABLE TRACTOR FRONT WHEEL TREAD
Filed Oct. 2, 1962    2 Sheets-Sheet 1

John F. Drenter
INVENTOR.

BY *Clarence A. O'Brien*
*and Harvey B. Jacobson*
Attorneys

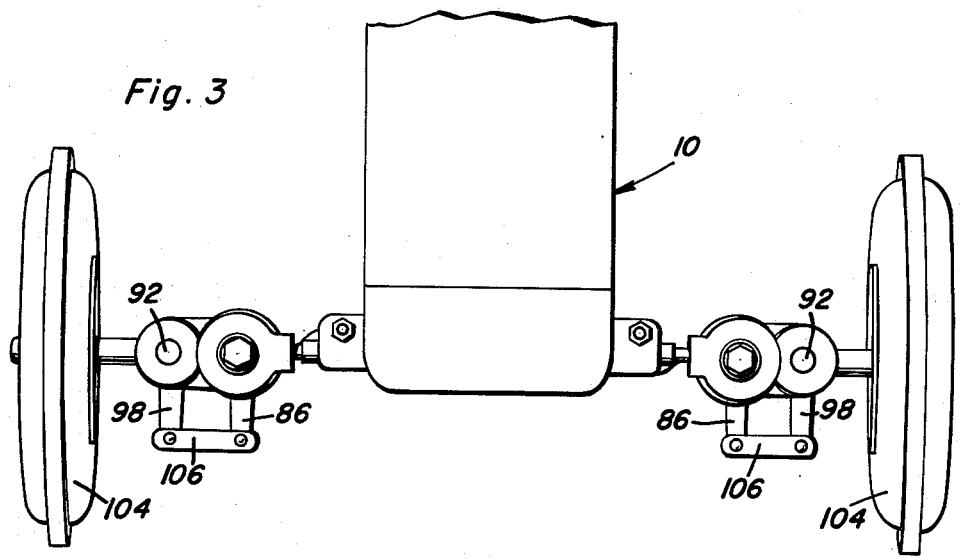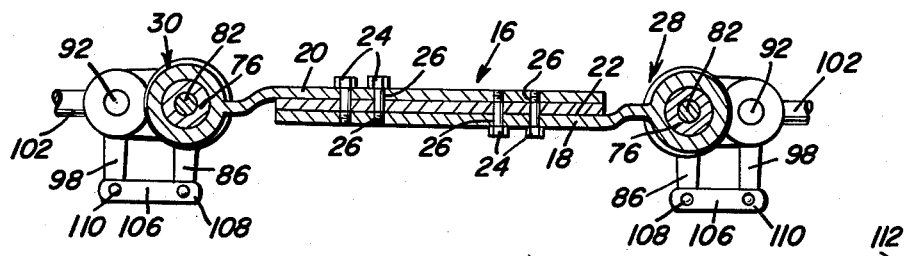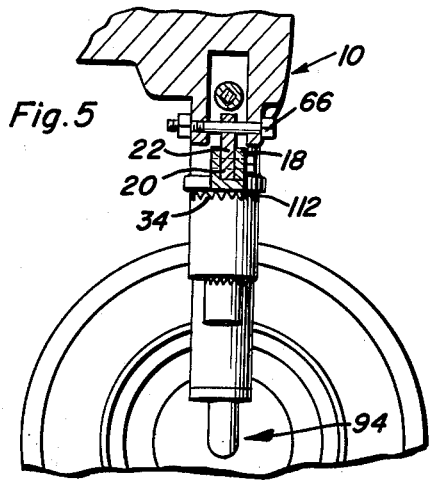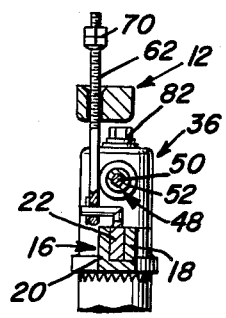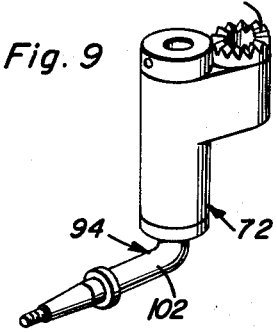

United States Patent Office 3,216,739
Patented Nov. 9, 1965

3,216,739
ADJUSTABLE TRACTOR FRONT WHEEL TREAD
John F. Drenter, R.R. 1, Davenport, Iowa
Filed Oct. 2, 1962, Ser. No. 227,827
9 Claims. (Cl. 280—34)

This invention relates to a novel and useful tractor front wheel assembly including means for adjusting the spacing between the front wheels of the tractor. The front wheel assembly includes mounts carried by opposite sides of the tractor frame and supported for up-and-down movement and also for rotation about an upstanding axis. Each of the mounts is provided with an axle having a ground-engaging wheel rotatably journaled thereon and each axle is supported from the corresponding mount for rotation about an upstanding axis spaced laterally of the axis of rotation of the mount. In this manner, the mounts may be disposed in adjusted rotated positions with the front wheels of the tractor disposed in their furthermost positions apart or the mounts may be rotated 180° relative to the tractor frame about their axes of rotation in order to swing the front wheels of the tractor into positions closely adjacent each other.

The main object of this invention is to provide a front wheel assembly for a tractor including a novel means whereby the tread width of the front wheel assembly may be readily adjusted between two positions with the front wheels disposed at different distances from each other.

Another object of this invention, in accordance with the immediately preceding object, is to provide a front wheel tractor assembly including means by which each front wheel of the tractor assembly may be selectively raised from the supporting surface of the tractor in order that it may have its mount rotated 180° in order to change the tread width of the front wheel assembly.

A still further object of this invention is to provide a tractor front wheel assembly in accordance with the immediately preceding object whose wheel mounts may be adjusted transversely of the tractor.

A further object of this invention is to provide a tractor front wheel assembly in accordance with the preceding objects whose wheel mounts are mounted for inverse up-and-down movement relative to the frame of the tractor.

A final object to be specifically enumerated herein is to provide a tractor front wheel assembly in accordance with the preceding objects which will conform to conventional forms of manufacture, be of simple construction and easy to adjust in width so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a top plan view of the embodiment illustrated in FIGURE 2;

FIGURE 4 is a fragmentary horizontal sectional view taken substantially upon the plane indicated by the section line 4—4 of FIGURE 2;

FIGURE 5 is a fragmentary longitudinal vertical sectional view taken substantially upon the plane indicated by the section line 5—5 of FIGURE 2;

FIGURE 6 is a longitudinal vertical sectional view taken substantially upon the plane indicated by the section line 6—6 of FIGURE 2;

FIGURE 9 is a detached perspective view of one component of the front wheel assembly of the instant invention.

Figure 1:
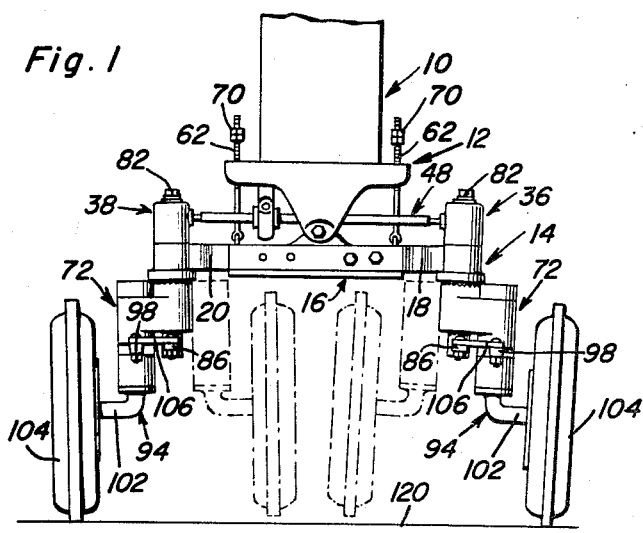
FIGURE 1 is a fragmentary front elevational view of a tractor whose front wheel assembly is constructed in accordance with the present invention and with alternate positions of the tractor front wheels shown in phantom lines.
Figure 8:
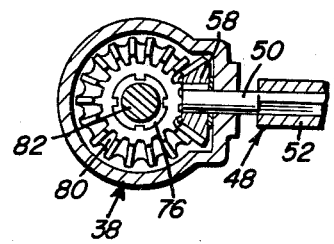
FIGURE 8 is an enlarged horizontal sectional view taken substantially upon the plane indicated by the section line 8—8 of FIGURE 2.

Referring now more specifically to the drawings the numeral 10 generally designates a tractor which includes rigid main frame means of which the transverse member generally referred to by the reference numeral 12 comprises a part.

The front wheel assembly of the instant invention is generally designated by the reference numeral 14 and includes an elongated support beam generally referred to by the reference numeral 16.

With attention now directed to FIGURE 4 of the drawings it may be seen that the support beam 16 includes a pair of beam end sections 18 and 20 whose adjacent ends are overlapped and sandwich an intermediate beam section 22. The end sections 18 and 20 and the intermediate section 22 are secured together by means of fasteners 24 and it may be seen that the support beam 16 may be extended and contracted in over-all length by the removal of the fasteners 24 and the longitudinal shifting of the end sections 18 and 20 to bring different ones of the pairs of bores 26 formed through the end sections 18 and 20 in registry with each other in order that one pair of the fasteners 24 may be secured therethrough.

Figure 2:
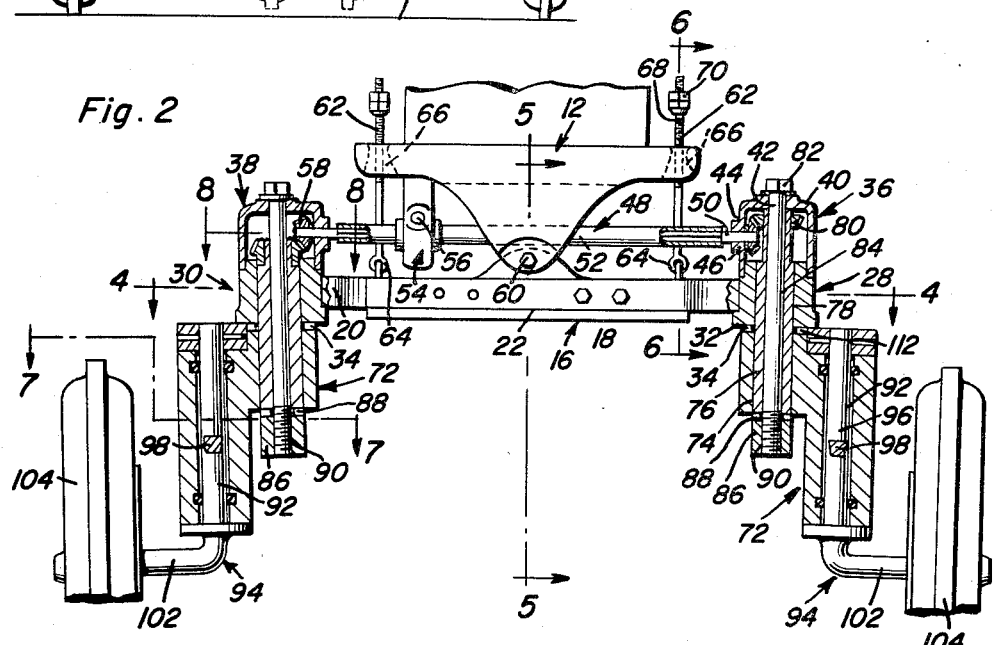
FIGURE 2 is an enlarged fragmentary front elevational view similar to that of FIGURE 1 but with portions of the front wheel assembly being broken away and shown in section.
Figure 7:
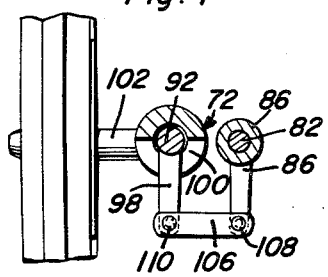
FIGURE 7 is a horizontal sectional view taken substantially upon the plane indicated by the section line 7—7 of FIGURE 2.

With attention now directed to FIGURE 2 of the drawings it may be seen that the end sections 18 and 20 include journal portions generally referred to by the reference numerals 28 and 30 respectively which are secured to the remote ends of the end sections 18 and 20 in any convenient manner.

The lower face 32 of each journal is provided with a plurality of serrations 34 disposed in a circle concentric with the longitudinal axis of that journal. The journals 28 and 30 include downwardly opening top housings generally referred to by the reference numerals 36 and 38 and the upper wall 40 of each top housing is centrally apertured as at 42. In addition, each of the confronting side walls 44 is suitably apertured as at 46.

A steering rod generally referenced to by the reference numeral 48 is provided and includes a pair of end sections 50 and an intermediate tubular section 52 into whose opposite ends the adjacent ends of the end sections 50 are telescopically received. The end sections 50 may be secured within the intermediate or center section 52 for rotation therewith in any convenient manner such as by means of a spline connection and a gearing assembly 54 is provided and includes an input shaft 56, the steering rod 48 comprising the output shaft of the gearing assembly 54.

The remote ends of the end sections 50 have bevel gears 58 mounted thereon for rotation therewith and it will be noted that the end portions of the end sections 50 are rotatably journaled in the bores 46 and that the bevel gears 58 are disposed within the top housings 36 and 38.

The support beam 16 is pivotally secured to the transverse member 12 by means of a pivot pin 60 and it may therefore be seen that the journals 28 and 30 are mounted for inverse up-and-down movement relative to the frame of the tractor 10.

A pair of tension bolts 62 are pivotally secured to opposite end portions of the support beam 16 as at 64 and each projects upwardly through a bore 66 formed in the corresponding end of the transverse member 12. The upper end of each of the bolts 62 is externally threaded as at 68 and has a nut 70 threadedly engaged therewith. By running a selected one of the nuts 70 down on the corresponding bolt 62, the corresponding end of the support beam 16 will be raised relative to the frame of the tractor 10. Inasmuch as the frame of the tractor 10 is rigid, the raising of one end of the support beam 16 will force the other end of the support beam downwardly while the frame of the tractor 10 remains substantially horizontally disposed.

A pair of wheel mounts generally referred to by the reference numeral 72 are provided and each includes a bore 74 in which a control shaft or sleeve 76 is rotatably received. The control sleeves 76 project upwardly beyond the upper ends of the bores 74 and are rotatably received in the bores 78 formed in the corresponding journal. Additionally, it may be seen that the control sleeves 76 extend through the bores 78 and that they have bevel gears 80 mounted on their upper ends for rotation therewith which are meshed with the bevel gears 58. An axle pin 82 is passed downwardly through each of the bores 42 and the bore 84 formed through the corresponding control sleeve 76. The axle pins 82 each project downwardly through the corresponding control sleeve 76 and project below the lower ends thereof. The lower end of each of the sleeves 76 has a crank arm 86 keyed thereto by means of interlocking serrations 88 and it will be noted that each of the crank arms 86 is provided with a threaded bore 90 into which the lower end of the corresponding axle pin 82 is threadedly engaged.

Each of the mounts 72 also includes a journal portion defined by a bore 92 which is spaced laterally of the longitudinal axis of the corresponding axle pin 82 and an L-shaped axle assembly generally referred to by the reference numeral 94 has its upstanding leg 96 rotatably received in the bore 92 and is provided with a laterally directed crank arm 98 which is swingable through a slot 100 formed in the mount 72. Each of the axle members 94 also includes a horizontal leg 102 on which a front wheel 104 is rotatably journaled. The free ends of the crank arms 86 and 98 are interconnected by means of a link 106 whose opposite ends are pivotally secured thereto as at 108 and 110 respectively.

It may be seen that the upper surface of each of the mounts 72 is provided with serrations 112 disposed in a circle concentric with the longitudinal axis of the corresponding axle pin 82. The serrations 34 and 112 interlockingly engage with each other upon the tightening of the axle pins 82 to maintain the mounts 72 in adjusted rotated position.

In operation, if it is desired to change the distance between the front wheels 104, the front end of the tractor 10 may be jacked up in the air and the support beam 16 may be extended or contracted as desired and in the manner previously set forth.

Additionally, if it is desired to change the width of the tread of the tractor 10, a selected one of the nuts 70 may be wound down its corresponding bolt 62 to raise the associated wheel 104 off of the supporting surface 120 for the tractor 10 by pushing down on the opposite front wheel 104 and thereby raising the frame of the tractor 10 relative to the surface 120. Thereafter, the raised mount 72 may be rotated 180° by the loosening of the axle pin 82 and the disengagement of the serrations 34 and 112 with each other. After the mount 72 has been rotated 180°, the corresponding axle pin 82 may then be again tightened. It will of course be noted that the crank arm 86 will also have to be loosened and dropped out of engagement with the serrations 88 in order that the mount 72 may be pivoted relative to the sleeve 76. Thereafter, the first moved nut 70 may be again moved back up to the upper end of the corresponding bolt 62 after which the other nut 70 may be threaded down the corresponding bolt 62 and into engagement with the upper surface of the transverse member 12 in order to lift the opposite end of the support beam 16. Thereafter, the corresponding mount 72 may be rotated 180° in the same manner previously set forth in order that the front wheels 104 may be positioned adjacent each other as illustrated in phantom lines in FIGURE 1 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a tractor having a frame, a front wheel assembly comprising a longitudinally extendable horizontally disposed support beam pivotally supported from said frame for rotation about a generally horizontal axis extending transversely of the mid-portion of said support beam, a pair of mounts journaled on the opposite ends of said beam for rotation about upstanding axes, an axle assembly supported from each of said mounts for rotation about an upstanding axis, a ground engageable wheel journaled from each of said axle assemblies for rotation about a horizontal axis, an elongated torque transmitting member journaled from each of said mounts for rotation about an axis substantially coinciding with the axis of rotation of the corresponding mount, means drivingly interconnecting corresponding torque transmitting members and axle assemblies for oscillation of the latter in response to oscillation of said torque transmitting members, an elongated steering rod journaled between said mounts and having its opposite ends drivingly connected to the corresponding torque transmitting members for oscillating the latter in response to oscillation of said steering rod, and means connected between said support beam and said mount for releasably retaining said mount in adjusted rotated positions relative to said support beam.

2. The combination of claim 1 wherein the axis of rotation of each of said axle assemblies is spaced laterally of the axis of rotation of the corresponding mount.

3. The combination of claim 1 wherein the upstanding planes in which said ground engaging wheels lie are spaced laterally from the axis of rotation of the corresponding mounts.

4. The combinations of claim 3 wherein the axis of rotation of each of said axle assemblies is spaced laterally of the axis of rotation of the corresponding mount.

5. The combination of claim 1 wherein the upstanding planes in which said ground-engaging wheels lie are spaced laterally from the axes of rotation of the corresponding axle assemblies.

6. The combination of claim 1 wherein said support beam is extendable in length and said steering rod includes a pair of aligned axially spaced end sections whose remote ends are journaled from the remote ends of said support beams and the center section disposed between said remote ends and having its opposite ends telescopingly engaged with the inner ends of said end sections and with said end sections keyed to said center section for rotation therewith.

7. The combination of claim 1 wherein the axis of rotation of each of said axle assemblies is spaced laterally of the axis of rotation of the corresponding mount, said means drivingly interconnecting said torque transmitting members and said axle assemblies including a pair of generally parallel radially outwardly projecting crank arms carried by corresponding pairs of said torque transmitting members and said axle members, and a connecting link pivotally secured at its opposite ends to the free ends of each pair of crank arms.

8. The combination of claim 1 wherein said mounts are adjustable laterally of the axis of rotation of said beam and said steering rod includes a pair of aligned axially spaced end sections whose remote ends are journaled from the remote ends of said support beam and a center section disposed between said remote ends and having its opposite ends telescopingly engaged with the adjacent ends of said end sections and with said end sections keyed to said center section for rotation therewith.

9. The combination of claim 1 including support means operatively connected between said frame and said beam for adjustably rotatably positioning said beam relative to said frame whereby said ground-engaging wheels may be selectively raised from engagement with the supporting surface on which said tractor is disposed.

References Cited by the Examiner
UNITED STATES PATENTS

| | | |
|---|---|---|
| 1,816,543 | 7/31 | Michelin. |
| 2,573,040 | 10/51 | May _____ 280—87 |
| 2,629,609 | 2/53 | Witson _____ 280—36 |
| 2,994,546 | 8/61 | Cooper _____ 280—111 |

FOREIGN PATENTS 1,090,894  10/60  Germany.

ARTHUR L. LA POINT, *Primary Examiner.*

PHILIP ARNOLD, *Examiner.*